(12) United States Patent
Shamir et al.

(10) Patent No.: US 12,536,426 B2
(45) Date of Patent: Jan. 27, 2026

(54) SMOOTH CONTINUOUS PIECEWISE CONSTRUCTED ACTIVATION FUNCTIONS

(71) Applicant: Google LLC, Mountain View, CA (US)

(72) Inventors: Gil Shamir, Sewickley, PA (US); Dong Lin, Mountain View, CA (US); Sergey Ioffe, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 717 days.

(21) Appl. No.: 16/902,547

(22) Filed: Jun. 16, 2020

(65) Prior Publication Data

US 2021/0133565 A1    May 6, 2021

Related U.S. Application Data

(60) Provisional application No. 62/928,463, filed on Oct. 31, 2019.

(51) Int. Cl.
   *G06N 3/08*  (2023.01)
   *G06N 3/04*  (2023.01)
   (Continued)

(52) U.S. Cl.
   CPC ............. *G06N 3/08* (2013.01); *G06N 3/04* (2013.01); *G06N 3/045* (2023.01); *G06N 3/047* (2023.01); *G06N 3/048* (2023.01); *G06N 3/063* (2013.01)

(58) Field of Classification Search
   CPC ........... G06N 3/08; G06N 3/04; G06N 3/045; G06N 3/047; G06N 3/048; G06N 3/063
   See application file for complete search history.

(56) References Cited

U.S. PATENT DOCUMENTS

| | | | |
|---|---|---|---|
| 11,256,978 B2* | 2/2022 | Pasca | G06F 7/548 |
| 2009/0043547 A1* | 2/2009 | Kirby | G06F 17/175 |
| | | | 703/2 |

(Continued)

FOREIGN PATENT DOCUMENTS

CN    108154224    6/2018

OTHER PUBLICATIONS

Basterretxea, K., and José Manuel Tarela. "Approximation of sigmoid function and the derivative for artificial neurons." advances in neural networks and applications, WSES Press, Athens (2001): 397-401. (Year: 2004).*

(Continued)

*Primary Examiner* — Miranda M Huang
*Assistant Examiner* — Sidney Vincent Bostwick
(74) *Attorney, Agent, or Firm* — DORITY & MANNING P.A.

(57) ABSTRACT

Aspects of the present disclosure are directed to novel activation functions which enable improved reproducibility and accuracy tradeoffs in neural networks. In particular, the present disclosure provides a family of activation functions that, on one hand, are smooth with continuous gradient and optionally monotonic but, on the other hand, also mimic the mathematical behavior of a Rectified Linear Unit (ReLU). As examples, the activation functions described herein include a smooth rectified linear unit function and also a leaky version of such function. In various implementations, the proposed functions can provide both a complete stop region and a constant positive gradient (e.g., that can be 1) pass region like a ReLU, thereby matching accuracy performance of a ReLU. Additional implementations include a leaky version and/or functions that feature different constant gradients in the pass region.

29 Claims, 6 Drawing Sheets

(51) Int. Cl.
  *G06N 3/045* (2023.01)
  *G06N 3/047* (2023.01)
  *G06N 3/048* (2023.01)
  *G06N 3/063* (2023.01)

(56) References Cited

U.S. PATENT DOCUMENTS

2015/0088795 A1  3/2015  Golovashkin et al.
2018/0121796 A1  5/2018  Deisher et al.
2018/0137413 A1  5/2018  Li et al.

OTHER PUBLICATIONS

Chen, Zhi, and Pin-han Ho. "Deep global-connected net with the generalized multi-piecewise ReLU activation in deep learning." arXiv preprint arXiv:1807.03116 (2018). (Year: 2018).*

Ohn, Ilsang, and Yongdai Kim. "Smooth function approximation by deep neural networks with general activation functions." Entropy 21.7 (2019): 627. (Year: 2019).*

Li, Jin-Cheng, et al. "Bi-firing deep neural networks." International Journal of Machine Learning and Cybernetics 5.1 (2014): 73-83. (Year: 2014).*

Pennington, Jeffrey, Samuel Schoenholz, and Surya Ganguli. "The emergence of spectral universality in deep networks." International Conference on Artificial Intelligence and Statistics. PMLR, 2018. (Year: 2018).*

Yun, Beong In. "A smoothening method for the piecewise linear interpolation." Journal of Applied Mathematics 2015 (2015). (Year: 2015).*

Chen, Justin. "Combinatorially generated piecewise activation functions." arXiv preprint arXiv:1605.05216 (2016). (Year: 2016).*

Telgarsky, Matus. "Neural networks and rational functions." International Conference on Machine Learning. PMLR, 2017. (Year: 2017).*

Merity, Stephen. "The NUGGET Non-Linear Piecewise Activation." SIGBOVIK 2018 (2018): 57. (Year: 2018).*

López-Rubio, Ezequiel, et al. "Piecewise polynomial activation functions for feedforward neural networks." Neural Processing Letters 50 (2019): 121-147. (Year: 2019).*

Zhou, Jun, et al. "Polynomial activation neural networks: Modeling, stability analysis and coverage BP-training." Neurocomputing 359 (2019): 227-240. (Year: 2019).*

Hassine, Radhia, et al. "Approximation properties of piece-wise parabolic functions fuzzy logic systems." Fuzzy Sets and Systems 157.4 (2006): 501-515. (Year: 2006).*

Sakurai, Akito. "Tight bounds for the VC-dimension of piecewise polynomial networks." Advances in neural information processing systems 11 (1998). (Year: 1998).*

Hou, Le, et al. "Neural networks with smooth adaptive activation functions for regression." arXiv preprint arXiv:1608.06557 (2016). (Year: 2016).*

Cohen, Elior, "SELU—Make FNNs Great Again (SNN)", towardsdatascience.com, Jul. 21, 2017, https://towardsdatascience.com/selu-make-fnns-great-again-snn-8d61526802a9, 7 pages.

Hendrycks et al., "Gaussian Error Linear Units (GELUs)", arXiv.org, Jul. 8, 2020, arxiv.org/abs/1606.08415v4, 9 pages.

Howard et al., "Searching for MobileNetV3", arXiv.org, Nov. 20, 2019, arxiv.org/abs/1905.02244v5, 11 pages.

Klambauer et al., "Self Normalizing Neural Networks", arxiv.org, Sep. 7, 2017, arxiv.org/abs.1706.02515v5, 102 pages.

Ramachandran et al., "Searching for Activation Functions", arXiv.org, Oct. 27, 2017, arxiv.org/abs/1710.05941v2, 13 pages.

Serengil, Sefik Ilkin, "ELU as a Neural Networks Activation Function", sefiks.com, Jan. 2, 2018, https://sefiks.com/2018/01/02/elu-as-a-neural-networks-activation-function/, 8 pages.

Machine Translated Chinese Search Report Corresponding to Application No. 2020109651732 on Nov. 21, 2025.

* cited by examiner

SMOOTH CONTINUOUS PIECEWISE CONSTRUCTED ACTIVATION FUNCTIONS

CROSS-REFERENCE TO RELATED APPLICATIONS

This application claims priority to and the benefit of U.S. Provisional Patent Application No. 62/928,463 filed on Oct. 31, 2019, which is hereby incorporated by reference in its entirety.

FIELD

The present disclosure relates generally to neural networks, and, more particularly, to activation functions for neural networks.

BACKGROUND

Neural networks, also referred to as artificial neural networks, includes a class of machine-learned models that include a group of connected nodes, which also can be referred to as neurons or perceptrons. A neural network can be organized into one or more layers. Neural networks that include multiple layers can be referred to as "deep" networks. Each node in a neural network can include an activation function. An activation function can define an output of a node given a set of inputs. Inputs to the neural network can propagate through the layers of nodes via the activation functions to compute the output of the neural network.

SUMMARY

Aspects and advantages of embodiments of the present disclosure will be set forth in part in the following description, or can be learned from the description, or can be learned through practice of the embodiments.

One example aspect of the present disclosure is directed to a computing system that includes one or more processors and one or more non-transitory computer-readable media that store data descriptive of a neural network that comprises one or more artificial neurons that implement an activation function. The activation function includes two or more piecewise segments, each of the two or more piecewise segments having a gradient. The activation function includes one or more transition points between the two or more piecewise segments, wherein the two or more piecewise segments and the gradients of the two or more piecewise segments are continuous at the one or more transition points. The activation function includes one or more activation function parameters defining the two or more piecewise segments, wherein the one or more activation function parameters are selected from a solution set such that the two or more piecewise segments and the gradients of the two or more piecewise segments are continuous at each of the one or more transition points.

In some implementations, the activation function comprises a full stop region and a pass region.

In some implementations, the activation function comprises a leaky region.

In some implementations, the activation function is smooth.

In some implementations, the activation function is continuous.

In some implementations, the activation function is monotonic.

In some implementations, the two or more piecewise segments comprise at least one of a linear segment and a quadratic segment.

In some implementations, the two or more piecewise segments comprise a left linear segment, a middle quadratic segment, and a right linear segment.

In some implementations, the two or more piecewise segments comprise a non-linear segment.

In some implementations, the activation function crosses an origin.

In some implementations, the activation function is expressed as a combination of at least one of one or more shifted rectified linear unit functions and one or more hard tan h functions.

In some implementations, the one or more transition points are symmetric about an origin.

In some implementations, the activation function comprises a left full stop region, a middle quadratic region, and a right pass region.

In some implementations, the activation function comprises a leftmost piecewise segment that is leaky or has a negative gradient.

In some implementations, the activation function comprises a left full stop region, a middle leaky region, and a right pass region.

In some implementations, the left full stop region comprises a left linear segment, wherein the middle leaky region comprises a middle linear segment, and wherein the right pass region comprises a right linear segment.

In some implementations, the activation function further comprises a left transition quadratic segment between the left linear segment and the middle linear segment, and a right transition quadratic segment between the middle linear segment and right linear segment.

In some implementations, different mathematical activations are used for different layers of the neural network.

In some implementations, one or both of: (1) the one or more activation function parameters; and (2) the two or more piecewise segments are learned in training for: (i) the entire neural network; (ii) each layer of the neural network separately; or (iii) each artificial neuron separately.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

Overview

Figure 1:
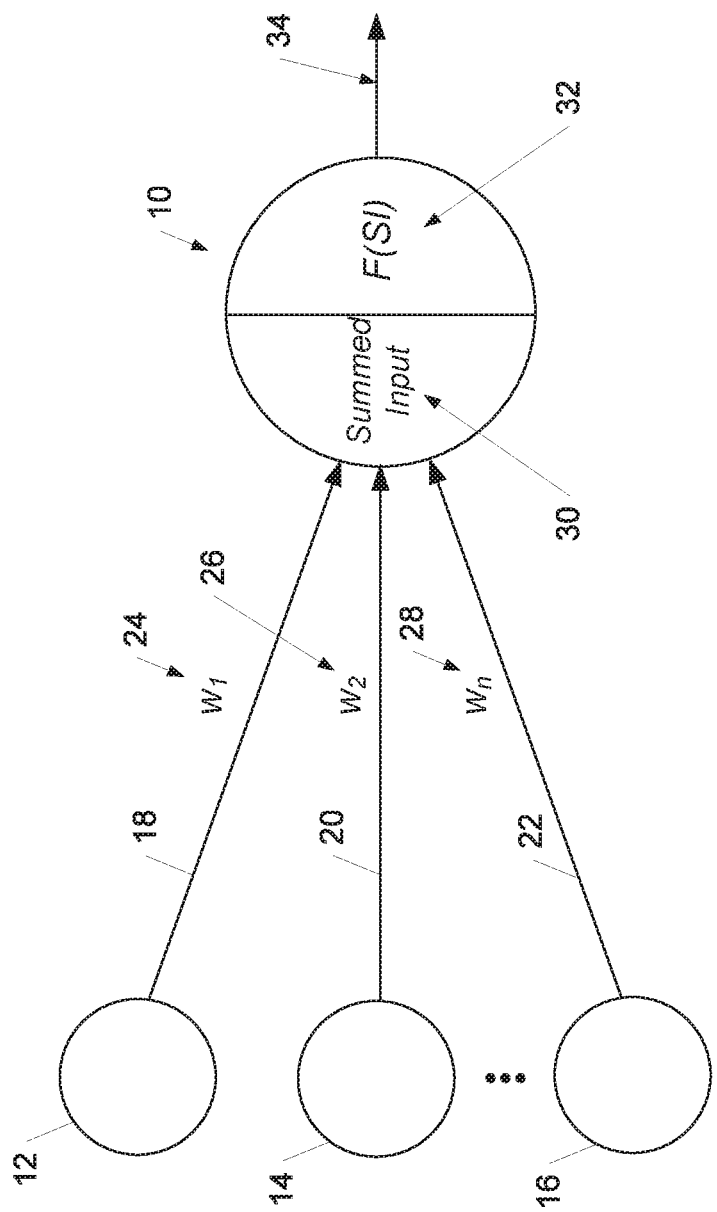
FIG. 1 depicts a graphical diagram of an example artificial neuron according to example implementations of the present disclosure.

Aspects of the present disclosure are directed to novel activation functions which enable improved reproducibility and accuracy tradeoffs in neural networks. In particular, the present disclosure provides a family of activation functions that, on one hand, are smooth with continuous gradient and optionally monotonic but, on the other hand, also mimic the mathematical behavior of a Rectified Linear Unit (ReLU). As examples, the activation functions described herein include a smooth rectified linear unit function and also a leaky version of such function. In various implementations, the proposed functions can provide both a complete stop region and a constant positive gradient (e.g., that can be 1) pass region like a ReLU, thereby matching accuracy performance of a ReLU. Additional implementations include a leaky version and/or functions that feature different constant gradients in the pass region. In some applications, a full stop region is desirable. However, a version which allows a negative gradient in the left region is also possible.

The proposed family of activation functions have a number of benefits. As one example, the function family provides better tradeoffs between performance accuracy and reproducibility of deep models. As another example, some implementations of the proposed functions are deployable with limited functionality hardware, for example such as hardware that supports only ReLU and HardTanh activations (e.g., unlike activations such as SoftPlus, Swish, SeLU, GeLU, and others). Superior tradeoffs on accuracy and reproducibility have been demonstrated by empirical results which are summarized herein.

More generally, many linear models can be reproducible. For instance, in some cases, if two identical models are trained using the same training set, the predictions of the two models on validation examples can be similar or approximately identical, even if the training examples are seen in different order and even in highly parallelized distributed systems.

Often, however, this strict reproducibility is not the case for non-linear models that include and use Rectified Linear Unit (ReLU) activation functions. For models using ReLU activation functions, a significant prediction difference between two such models can occur if the two models are trained on randomized training sets, even when the sets consist of identical data examples. Furthermore, the prediction difference often does not decay with more training examples.

However, non-linear deep models with ReLU activation functions can substantially outperform their linear counterparts in accuracy. Thus, the use of non-linear models with ReLU activations versus linear models represents a trade off of reproducibility in favor of accuracy. Specifically, it is hypothesized that the non-linearity and the non-convex objective of the ReLU models contribute to the substantial improvement in performance, at the expense of reproducibility.

In particular, it is hypothesized that use of activation functions that feature a non-continuous gradient results in partitioning of the parameter domain into separate regions, each of which has a unique local optimum. Many of the local optima may be identical in the overall total objective but may not be identical with regard to prediction for individual examples. Randomness in training (e.g., order of examples, order of updates, etc.) can cause the model parameters to trend toward one of the regions, and eventually lock the parameters near or at the local optimum of that region. Thus, the resultant model parameters may be different between different instances of the same model even with the same set of training examples, depending on the region that the parameters trend toward.

The ReLU activation function is not a smooth function and, as a result, has a non-continuous gradient. As described above, discontinuity in the gradient is hypothesized to contribute to irreproducibility through partitioning of the objective space, giving the model more opportunities to diverge during training.

In view of the above, the present disclosure provides activation functions which retain the benefits of non-linearity but avoid the contributions to irreproducibility introduced by non-continuous gradients. In particular, the present disclosure provides smoother activation functions, which give a smoother objective space. However, to keep accuracy benefits, the activation functions are, at least in part, non-linear, such that the functions behave similar to ReLU activation function. Moreover, in some cases, the activation function can be a monotonic function. However, in some cases, one or more of these qualities can be conflicting. As such, the present disclosure provides activation functions that can manage the tradeoff between accuracy and reproducibility.

In particular, example aspects of the present disclosure are directed to an activation function that includes two or more piecewise segments. Each of the two or more piecewise segments exhibits a gradient. The two or more piecewise segments define one or more transition points between the two or more piecewise segments.

The two or more piecewise segments can include one or more variable activation function parameters. One or more values for the one or more activation function parameters can be selected from a solution set such that the activation function satisfies one or more constraints. For example, values for the one or more activation function parameters can be selected such that the activation function is smooth, continuous, has a continuous gradient (e.g., at transition points), is monotonic, includes a stop region, includes a pass region, includes a leaky region, and/or other suitable constraints. For instance, the values for the one or more activation function parameters can be selected such that the activation function is continuous and has a continuous gradient. Constraining the activation function to be continuous and have a continuous gradient can improve reproducibility of the activation function.

In some implementations, the activation function includes one or more piecewise linear and/or quadratic segments, is continuous and has continuous gradients at the transition points between such segments. Additionally or alternatively, the activation function can include one or more piecewise non-linear segments, such as exponential segments.

One example embodiment of the activation functions described herein includes a left linear segment and a right linear segment. A quadratic segment connects the left linear segment to the right linear segment. One or more activation function parameters define the linear and quadratic segments. For instance, one example piecewise activation function having a left and right linear segment and middle quadratic segment is given by the equation below.

$$y = \begin{cases} g_-x + s_-; & x \le -\alpha \\ ax^2 + bx + c; & -\alpha \le x \le \beta \\ g_+x + s_+; & x > \beta \end{cases}$$

In the example piecewise activation function given above, the one or more activation function parameters includes a left linear segment gradient g- and a right linear segment gradient g+. In some cases, g+>g-. For instance, in some cases which can be referred to as "non-leaky", g-=0 and g+=1. The transition point between the left linear segment and the quadratic segment occurs at -α and the transition point between the quadratic segment and the right linear segment occurs at β. In some cases, -α is negative and β is positive.

Additionally, in some implementations, the one or more activation function parameters can include an initial vertical shift t of the quadratic region. In some cases, t<=0. The activation function parameters s- and s+ are biases and a, b, and c, are coefficients. The biases and coefficients can be determined to satisfy constraints such as continuity, monotonicity, smoothness, and/or other desired constraints. Thus, the example piecewise activation function can be defined by or otherwise include these activation function parameters.

In some cases, values for the activation function parameters can be selected such that the activation function is continuous and has a continuous gradient at the transition points -α and β. Additionally or alternatively, the activation function can be constrained by an initial value t at an arbitrary point, such as -α.

As one non-limiting example of a process for selecting parameter values, values for the activation function parameters can be derived as follows. Starting with the middle region, three example constraints include: Two continuity constraints on the gradients, one at -α and the other at β; and one constraint on the value of the activation at one point. As an example, that point can be selected to be -α where the quadratic transition region starts, yielding the following.

$$\left.\frac{dy}{dx}\right|_{z=-\alpha} = g_-$$

$$\left.\frac{dy}{dx}\right|_{z=\beta} = g_+$$

$$y(x = -\alpha) = t$$

Solving these equations gives the values of a, b, and c as follows:

$$a = \frac{g_+ - g_-}{2(\alpha + \beta)}$$

$$b = \frac{\alpha g_- + \beta g_-}{\alpha + \beta}$$

$$c = t + \frac{\alpha^2(g_+ + g_-) + 2\beta\beta g_-}{2(\alpha + \beta)}$$

It remains to find the shifts (s- and s+) in both linear regions. These can be computed by constraining continuity of the function at the transition points. Ensuring continuity gives one specific example proposed activation function which has the following form:

$$y = \begin{cases} g_-x + t + g_-\alpha; & x \le -\alpha \\ ax^2 + bx + c; & -\alpha \le x \le \beta \\ g_+x + t + \frac{\alpha+\beta}{2}g_- + \frac{\alpha-\beta}{2}g_+; & x > \beta \end{cases}$$

The example embodiment described above, termed herein the Generalized Leaky "Smooth Rectified Linear Unit" or "SmeLU" activation function, illustrates an example of a larger family of activation functions that can be smooth, have a continuous gradient, and (optionally) be monotonic while mimicking the mathematical behavior of a Rectified Linear Unit (ReLU). Example variants within this larger family may have some or all of the following features.

As one example, in some implementations, the activation function can include a stop region having a gradient of about zero and a pass region with a constant positive gradient, similar to a ReLU function. For instance, the stop region and pass region can be defined by the linear piecewise segments. Thus, the activation function can achieve accuracy close to that of a ReLU function while having improved reproducibility due to satisfaction of constraints such as smoothness, continuous gradient, and/or monotonicity.

Additionally, the example embodiment described above can allow for variable values of the gradients (e.g., g+ and g-), vertical shift t, and coefficients α and β. For instance, in some implementations, the values of gradients and coefficients can be defined such that the activation function mimics the mathematical behavior of a ReLU activation function. For example, the gradients can be defined such that g- is zero and g+ is about one.

As another example, additionally or alternatively to the other example parameter values, the vertical shift can be defined as about zero. This allows for a full stop region at the left linear segment and a pass region with a gradient of about one at the right linear segment.

As another example, the coefficients can be defined such that α=β, achieving a "symmetric" activation function. In other words, the transition points can be symmetric about an origin (e.g., with transition region midpoint x=0). In some implementations, a simple symmetric version with a single parameter of SmeLU may be sufficient. Such an implementation can be obtained when α=β. Specifically, for the simple SmeLU, $$y = \begin{cases} 0; & x \le -\beta \\ \frac{(x+\beta)^2}{4\beta}; & |x| \le \beta \\ x; & x \ge \beta \end{cases}$$

As another example, a leaky piecewise activation function can include a g- that is greater than zero but still less than g+. In other words, the left linear segment can define a leaky region. Thus, the leaky piecewise activation function can mimic the mathematical behavior of a "leaky" ReLU activation function. The leaky piecewise activation function can achieve behavior closer to that of a linear activation function, which results in greater reproducibility. As a result, in some cases, the leaky piecewise activation function can achieve an improvement in reproducibility. An example of such an activation is given by $$y = \begin{cases} 0; & x \le \alpha \\ \dfrac{(x+\alpha)^2}{2(\alpha+\beta)}; & -\alpha \le x \le \beta \\ x + \dfrac{\alpha-\beta}{2}; & x \ge \beta \end{cases}$$

In some implementations, a leaky version of simplified activation may be desirable. This can be achieved, for example, by g-–>0, but g-<g+, with g+=1 and t=0.

As another example, the activation function can be shifted horizontally and/or vertically. For instance, the activation function can be shifted vertically by the vertical shift t and shifted horizontally by a horizontal shift s such that shifted activation z(x) equals original activation y(x) evaluated at y(x−s).

In some cases, the activation functions described herein can be used to approximate a generalized SoftPlus activation function, which is given as follows:

$y = \gamma \ln(1 + \exp(x/\gamma))$

The SoftPlus activation function provided above asymptotically approaches a vertically shifted symmetric version of one specific implementation of the proposed activation functions, approaching a gradient of zero farther left of the origin, and a gradient of one farther right from the origin. In the region x→0 from both sides, the Taylor series approximation $$y \approx \gamma \ln 2 + \frac{x}{2} + \frac{x^2}{8\gamma}$$

can be used to show that SoftPlus asymptotically approaches a vertically shifted up symmetric variant of the proposed SmeLU function, where β=2γ, and the vertical shift is a function of β, given by $$y_{softplus-\gamma}(x) = y_\beta(x) + \frac{\beta}{4}\ln\frac{4}{e}, \beta = 2\gamma.$$

Note, however, that the SoftPlus function does not provide a full stop in the stop region, especially for lower magnitude negative x, and larger values of γ.

As another example, the proposed activation function can be shifted such that the activation function crosses an origin. For instance, the activation function can output a zero if an input value is zero. The origin-crossing activation function can preserve a sign of the input value. In other words, the output can be negative and/or zero if the input is negative, and positive if the input is positive. One example origin-crossing piecewise activation function is given below.

$$y = \begin{cases} g_- \cdot x + \dfrac{\alpha^2(g_- - g_+)}{2(\alpha+\beta)}; & x \le -\alpha \\ \dfrac{g_+ - g_-}{2(\alpha+\beta)}x^2 + \dfrac{\alpha g_+ + \beta g_-}{\alpha+\beta}x; & -\alpha \le x \le \beta \\ g_+ \cdot x + \dfrac{\beta^2(g_- - g_+)}{2(\alpha+\beta)}; & x \ge \beta \end{cases}$$

In some implementations, the activation function can include additional linear, polynomial (e.g., quadratic), and/or other non-linear piecewise segments. For instance, a smooth and continuous activation function with continuous gradient can include more than two linear segments, defining multiple leaky regions, full stop regions, and/or pass regions. For instance, one example embodiment includes a linear full stop region, a linear leaky region, and a linear pass region with quadratic transition regions between some or all of the linear regions. As another example, polynomial and/or other non-linear regions can be used in place of transition regions and/or linear regions.

In some implementations, values for the one or more activation function parameters can be learned by training. In some implementations, the values for the activation function parameters can be learned separately from the other parameters (e.g., weights, biases, etc.) of the network. Alternatively or additionally, the values for the activation function parameters can be learned jointly with the other parameters of the network. For instance, a neural network can be trained to learn values for the one or more activation function parameters that optimize for one or more training objectives, such as, but not limited to, accuracy, reproducibility, or any other suitable training objectives. For instance, optimizing for the one or more training objectives can include learning parameter values for the activation function parameters such that the one or more learning objectives are optimized (e.g., maximized and/or minimized) in objective space at the parameter values. In some cases, an overall training objective can be defined as a mean or weighted/costed sum of multiple training objectives. This can allow training to optimize for several training objectives, such as training objectives that may be conflicting (e.g., accuracy and reproducibility).

In some implementations, the activation function parameters can have identical values at each activation function in a neural network. Additionally or alternatively, respective values for the activation function parameters can be learned for each layer (e.g., hidden layer). For instance, the activation function parameters can have identical values for each activation function in one of the one or more layers, which may be different from values of activation function parameters in other layers. Additionally or alternatively, the activation function parameters can be learned uniquely for each activation node (e.g., each respective activation function implemented by each respective node).

In some implementations, the learning rate for learning the parameter values can be adjusted based on the choice of parameterization. Adjusting the learning rate can allow for better convergence (e.g., more accurate convergence) during training. For instance, in cases where the same parameter values are used at each activation function, the gradients can be summed from all units, whereas in cases where respective values for each activation function are learned uniquely, the gradients are sampled individually. Thus, the learning rate for the first case may need to be smaller than the second case to allow for better convergence.

Additionally, in some cases, the choice of parameterization can provide different results depending on the choice of training objective. For instance, if optimizing for accuracy, it may be desirable to learn parameter values for each layer or each activation function individually, as different layers can exhibit different trends of parameter values. For example, lower level layers may learn a negative g− while higher level layers may learn a monotonic parameterization.

In some cases, the neural network can be trained in multiple sessions. For example, in some implementations, the optimization of the activation function parameters is performed in an offline session. Thereafter, the learned activation function parameters are used wherein training the actual model in a subsequent session. Alternatively, the model (e.g., inclusive of activation function parameters) can be trained in a single session.

In some cases, reproducibility can be used as an explicit training objective (e.g., included and measured as part of the objective function). In one embodiment, reproducibility is included as a training objective during training of the model. Alternatively, however, the model is trained offline first to learn activation function parameters that are better for reproducibility, and then training is repeated using these activation function parameters to learn the model itself (e.g., with or without reproducibility as an explicit training objective). In some implementations, an ensemble can be used to optimize the activation function parameters offline (e.g., for reproducibility), and a single tower model can then be trained and deployed using the learned values of the activation function parameters(e.g., with or without reproducibility as an explicit training objective).

In some cases, ensembles can be used as a proxy for reproducibility during training. The ensembles may be in the same service, or across different services. For instance, in some cases, having the ensembles across different services may be more representative of deployment scenarios, and using the same service may be easier to implement. As one example, training can minimize a prediction difference loss or log-odds prediction difference between towers, or deep network components, of the ensemble. For instance, two towers can be trained to produce more identical predictions by imposing a loss on the deviation from one tower to the other tower. The loss can be propagated to the towers, and the networks in each tower move towards one another to improve the reproducibility between the predictions of the towers. While this can lead both towers to produce more similar predictions, it can undesirably reduce diversity provided by the different components of the ensemble.

Thus, it can be desirable to apply the cross-tower loss such that it does not diminish the diversity of the ensemble. One possible approach is to apply an L2 loss on the log-odds prediction difference between two towers and allow the gradients of this loss to propagate only to the learned activation function parameters of the piecewise activation function, and not to the actual model layer activations and the parameters that invoke them. For instance, a Stop-Gradient can be applied on the hidden layer nodes but not on the parameters for the L2 prediction difference loss. The model can be trained on a top level objective, where a Stop-Gradient is applied on the parameters but not on the activations in the hidden layers. This method can improve towards the objective with the learned values of the model parameters, while optimizing the learned values of the activation parameters to improve prediction difference. Other forms of losses can be used for the prediction difference objective, such as cross entropy loss that uses the prediction of one tower as the label for the other.

Another example advantage to training offline for reproducibility is that part of the benefit of the ensemble for reproducibility is attained by different initialization applied for the components of the ensemble. When the model is trained offline, towers that are initialized identically can be used without sacrificing the benefits of using an ensemble for training. In a first pass, the top level objective can be optimized for accuracy and the activation parameters can be optimized for reproducibility. In a second pass, the model can be trained with values of the activation function parameters fixed to the values learned in the first pass. If the deployed model is an ensemble, the components of the ensemble are now initialized differently such that the ensemble benefit can be maintained in the deployed model. If only a single tower is trained, the activation function parameters thus do not need to be optimized when training the model to be deployed.

In addition to learning parameters of the activations, the procedures described above can also be used to learn functional forms of the pieces of the smoothed piecewise activation. These can be learned while maintaining the continuity and smoothness (continuity of gradients) constraints. The number of pieces as well as the mathematical form of each piece can be learned, where the latter can be learned from a large given set of functional forms.

According to another aspect of the present disclosure, some of the proposed activation functions can provide the benefit of being deployable on simple hardware. For instance, some processing units (e.g., tensor processing deployment hardware units) may provide limited support for activation functions. For example, some tensor processing deployment hardware may only support ReLU and clipped linear or hard tan h activations. Thus, some activation functions, such as, for example, SoftPlus, GeLU, or SeLU, cannot be deployed on these tensor processing units.

In contrast, some implementations of the proposed activation functions can require only simple math to compute (e.g., first and second order polynomials can be used instead of relatively complicated functions such as exponential functions or higher-order polynomial functions).

Additionally, some implementations of the proposed activation functions can be expressed as a combination of shifted rectified linear unit functions and/or hard tan h functions. For example, a symmetric SmeLU activation function can be expressed according to the equations below. The equations given below can be implemented on simple hardware that only supports ReLU operations. Additionally, if the hardware supports hard tan h operations, it can also be used in place of the ReLU. Generally, fewer segments will provide better continuity of the gradient if the activation is deployed in training, although, usually, training has better functionality and can use the direct mathematical implementation. Deployment, on the other hand, may be limited.

ReLU implementations of the Symmetric can be:

$$y = \frac{1}{4\beta}[ReLU^2(x+\beta) - ReLU(x-\beta)ReLU(x) + \beta ReLU(x-\beta)]$$

or the simpler form $$ReLUx(x, a) = \max\{0, \min[x, a]\}$$
$$y = \frac{1}{4\beta} \cdot ReLUx(x+\beta, 2*\beta) \cdot ReLU(x+\beta) + \frac{1}{2} \cdot ReLU(x-\beta)$$

In some implementations, the activation function expressed as a piecewise function can be used for training and/or backpropagation, and the activation function expressed as a combination of ReLU and/or hard tan h functions can be used for deployment. Using the actual piecewise function for training can avoid influence from any potential gradient discontinuities and/or implementation constraints in the combination of functions with non-continuous gradients.

Activation functions according to example aspects of the present disclosure can achieve a number of technical effects and benefits. For example, activation functions according to example aspects of the present disclosure can be smooth. In other words, the activation functions can be continuous and have a continuous gradient. Additionally, the activation functions can be monotonic. Additionally, the activation functions can include any desirable type and number of regions, such as full stop regions, pass regions, and/or leaky regions. In this way, the activation functions according to example aspects of the present disclosure can achieve an improved tradeoff between accuracy and reproducibility, both for single tower and ensemble models, over existing activation functions such as ReLU while maintaining the behavior of the existing activation functions. Thus, multiple identically structured models can exhibit more consistent predictions while also providing desirable accuracy. Additionally, the activation functions according to example aspects of the present disclosure can be deployed on limited hardware that may not support more complex activation functions.

Example Neuron

FIG. 1 provides a graphical diagram of an example artificial neuron 10. The artificial neuron 10 can be connected to one or more presynaptic neurons 12, 14, 16. The artificial neuron 10 can be connected to the presynaptic neurons 12, 14, 16 via artificial synapses 18, 20, 22. The presynaptic neurons 12, 14, 16 can pass presynaptic neuron outputs to the artificial neuron 10 via the artificial synapses 18, 20, 22.

Each synapse 18, 20, 22 can have an adjustable weight 24, 26, 28 (e.g., scalar weight) associated therewith. The weights 24, 26, 28 can be changed as a result of learning. Each artificial synapse 18, 20, 22 can be either excitatory (e.g., have a positive-valued weight), which increases the summed input of the receiving neuron 10 upon receipt, or inhibitory (e.g., have a negative-valued weight), which decreases the summed input of the receiving neuron 10 upon receipt.

The artificial neuron 10 can also have an activation function 32, which controls the output 34 of the neuron 10 based on the summed input 30. In particular, the activation function 32 can be any of the proposed activation functions described herein (e.g., a smooth piece-wise continuous activation function). Use of an activation function 32 as described herein can improve reproducibility without sacrificing accuracy.

Although not explicitly shown in FIG. 1, various other parameters can impact the behavior of the artificial neuron 10 such as, for example, bias parameter(s), and/or the like.

Graphical Depictions of Example Activation Functions

Figure 2:
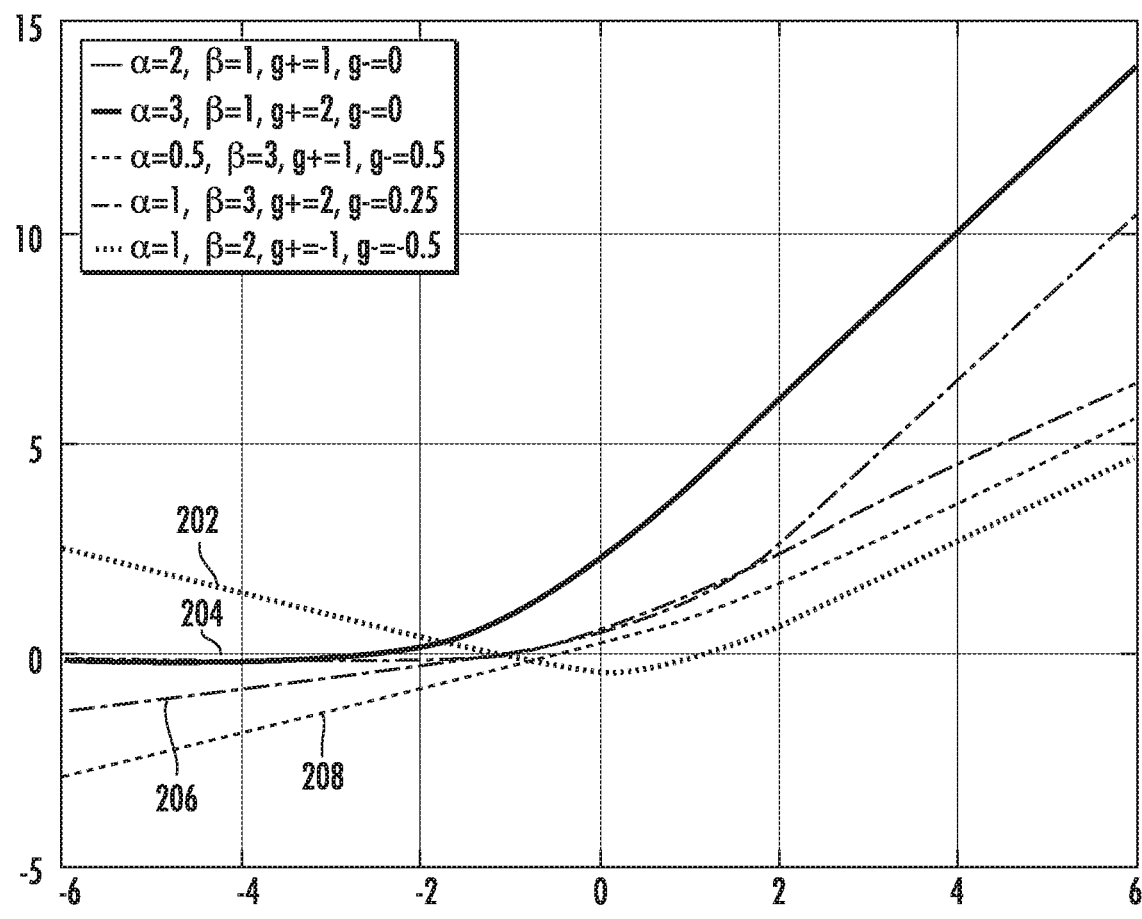
FIG. 2 depicts graphical plots of example activation functions according to example implementations of the present disclosure.

FIG. 2 illustrates example activation functions according to example implementations of the present disclosure. In particular, curves 202-208 illustrate a family of piecewise activation functions having a left linear segment, middle quadratic segment, and right linear segment with varying parameter values. For instance, curves 202-208 illustrate a family of piecewise activation functions according to the equation below.

$$y = \begin{cases} g_-x + t + g_-\alpha; & x \le -\alpha \\ ax^2 + bx + c; & -\alpha \le x \le \beta \\ g_+x + t + \frac{\alpha+\beta}{2}g_- + \frac{\alpha-\beta}{2}g_+; & x > \beta \end{cases}$$

The particular example values for the parameters of the example activation functions of curves 202-208 are illustrated in FIG. 2.

Figure 3:
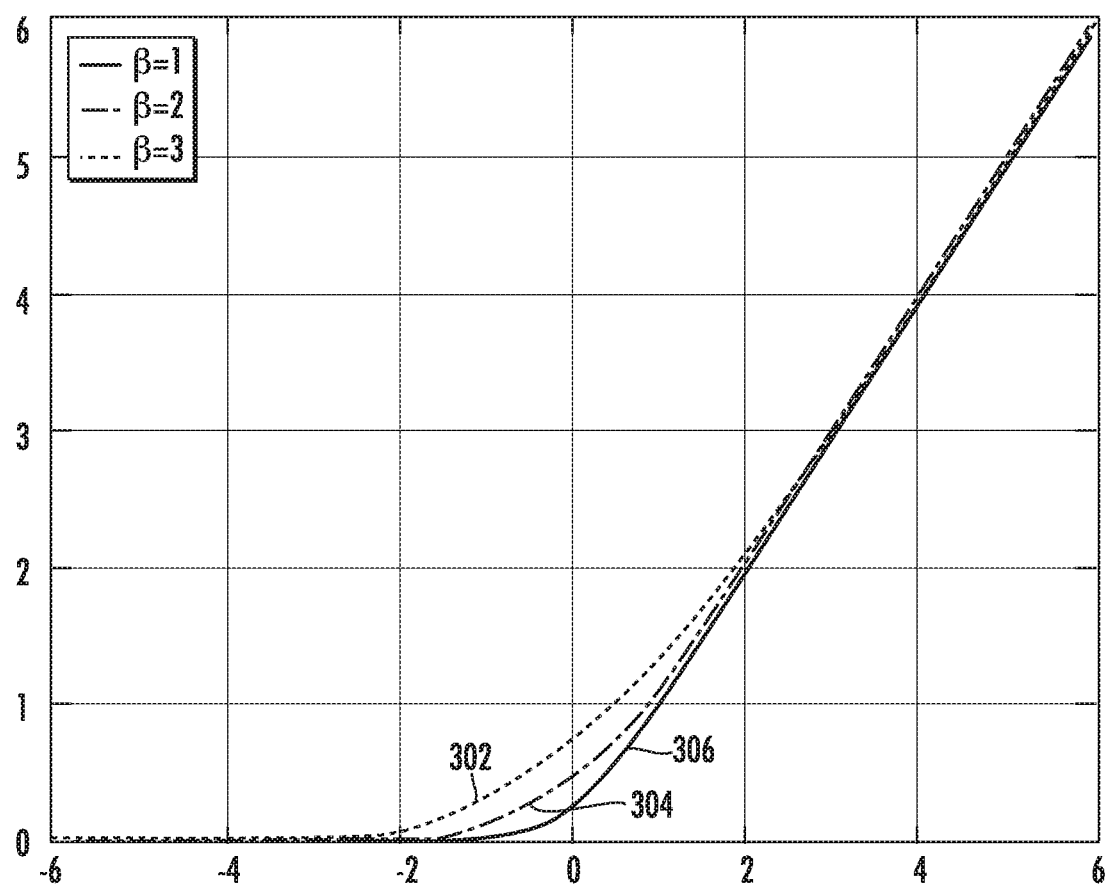
FIG. 3 depicts graphical plots of example activation functions according to example implementations of the present disclosure.

FIG. 3 illustrates example activation functions according to example implementations of the present disclosure. In particular, curves 302-306 illustrate a family of "symmetric" smooth piecewise activation functions with varying parameter values. Specifically, curves 302-306 illustrate example activation functions according to the form above, where $\alpha=\beta$, $g_-=0$, $g_+=1$, and $t=0$.

Example Devices and Systems

Figure 4A:
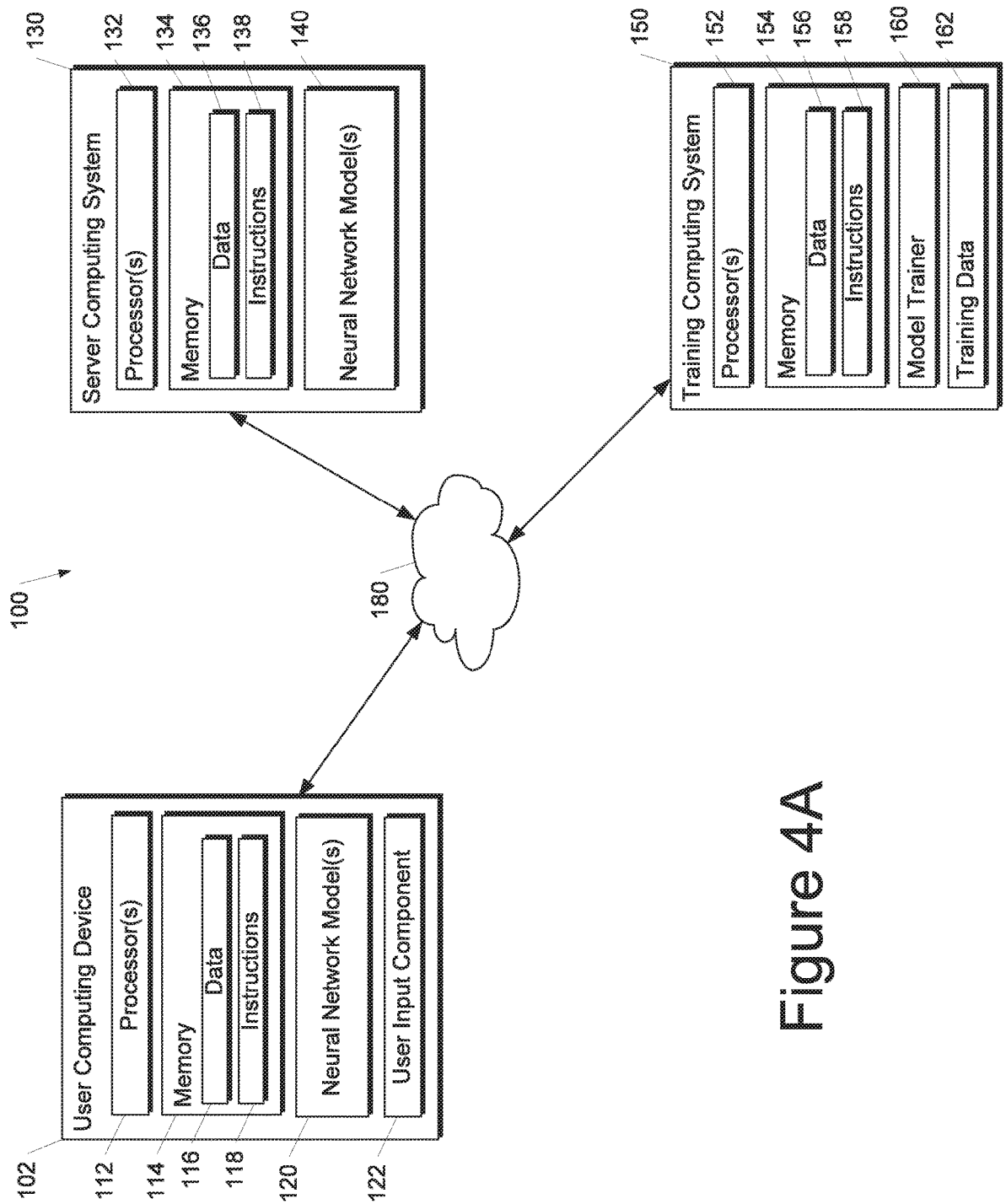
FIG. 4A depicts a block diagram of an example computing system that can implement machine-learned models according to example implementations of the present disclosure.

FIG. 4A depicts a block diagram of an example computing system 100 that can implement machine-learned models according to example implementations of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more neural network models 120. For example, the neural network models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example neural network models 120 are discussed with reference to FIG. 2.

In some implementations, the one or more neural network models 120 can be received from the server computing system 130 over network 180, stored in the user computing device memory 114, and then used or otherwise implemented by the one or more processors 112. In some implementations, the user computing device 102 can implement multiple parallel instances of a single neural network model 120.

Additionally or alternatively, one or more neural network models 140 can be included in or otherwise stored and implemented by the server computing system 130 that communicates with the user computing device 102 according to a client-server relationship. For example, the neural network models 140 can be implemented by the server computing system 140 as a portion of a service (e.g., a web service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned neural network models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained. In particular, the model trainer 160 can train the neural network models 120 and/or 140 based on a set of training data 162.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g. one or more image or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 4B:
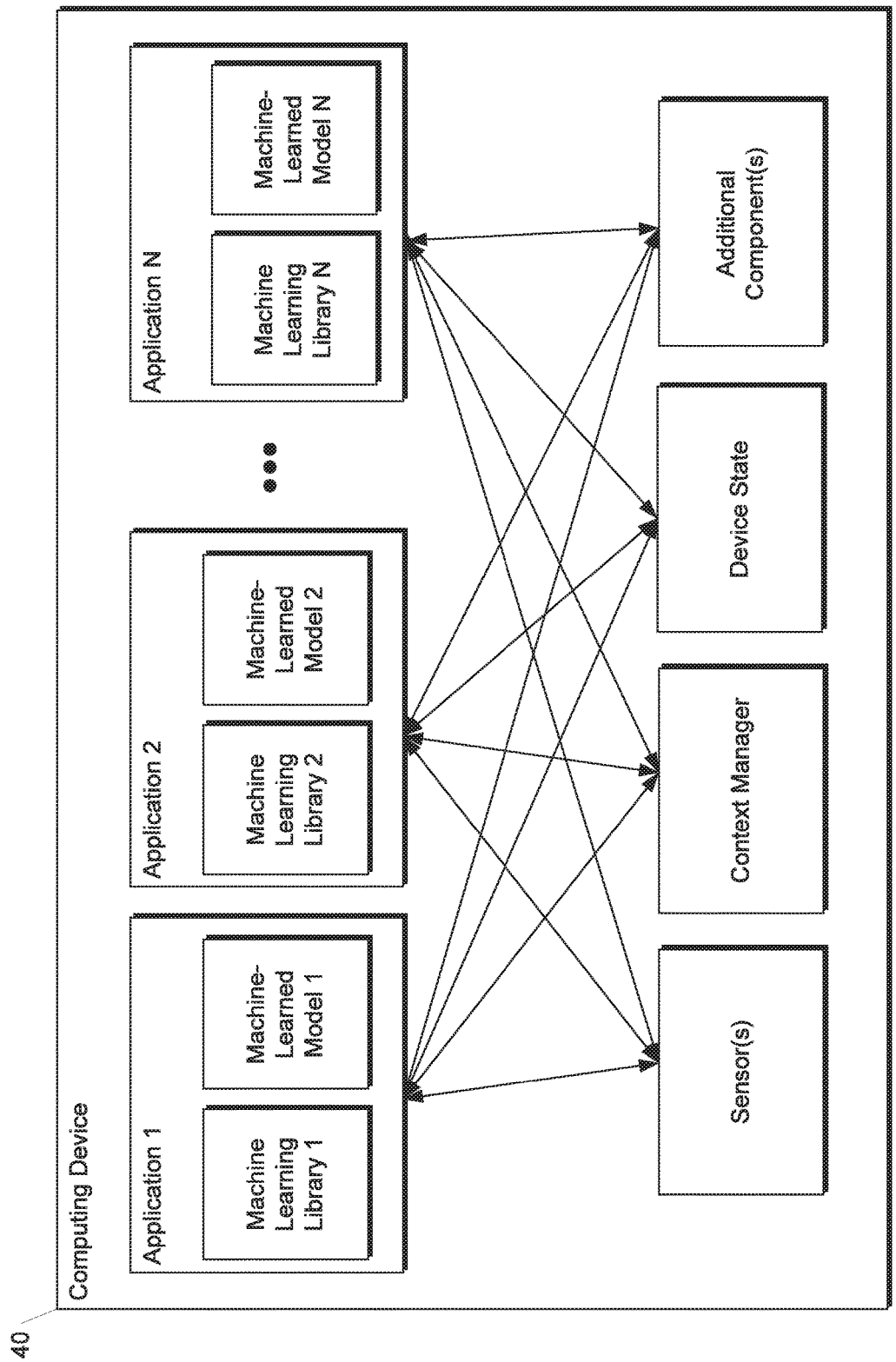
FIG. 4B depicts a block diagram of an example computing device that can implement machine-learned models according to example implementations of the present disclosure.

FIG. 4B depicts a block diagram of an example computing device 40 that can implement machine-learned models according to example implementations of the present disclosure. The computing device 40 can be a user computing device or a server computing device.

The computing device 40 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
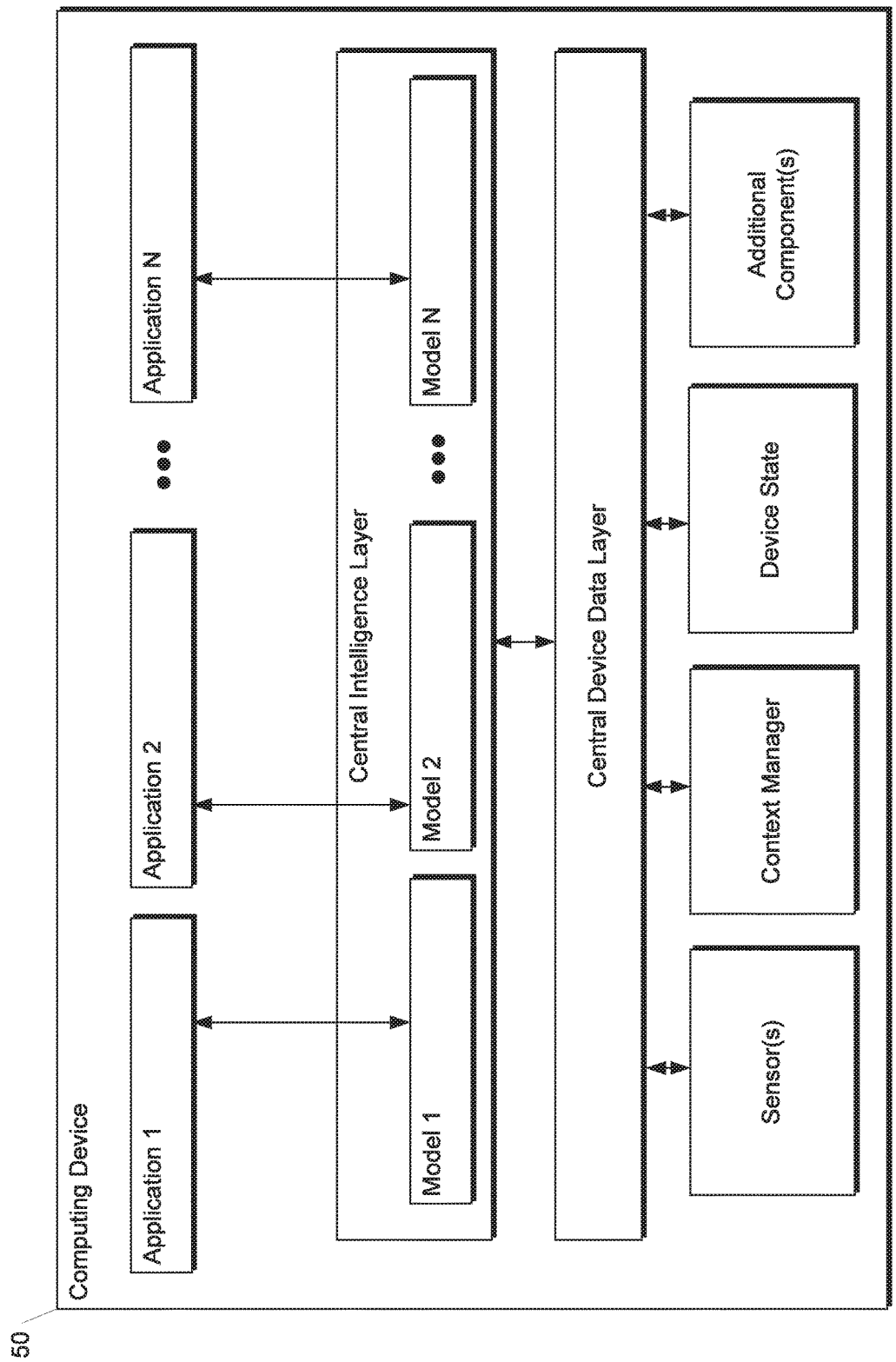
FIG. 4C depicts a block diagram of an example computing device that can implement machine-learned models according to example implementations of the present disclosure.

FIG. 4C depicts a block diagram of an example computing device 50 that performs joint forecasting according to example implementations of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. One or more non-transitory computer-readable media storing a neural network comprising:
a first layer comprising an activation function for each of a plurality of nodes in the first layer, the activation function parameterized by first one or more learned activation function parameters defining two or more first piecewise segments, wherein the activation function is monotonic over the two or more first piecewise segments, and wherein each respective first piecewise segment of the two or more first piecewise segments has a respective first gradient that is continuous at one or more first transition points between the two or more first piecewise segments;
a second layer comprising the activation function for each of a plurality of nodes in the second layer, the activation function parameterized in the second layer by second one or more learned activation function parameters defining two or more second piecewise segments, wherein the activation function is monotonic over the two or more second piecewise segments, and wherein each respective second piecewise segment of the two or more second piecewise segments has a respective second gradient that is continuous at one or more second transition points between the two or more second piecewise segments;

wherein the neural network is trained to jointly learn:
the first one or more learned activation function parameters;
the second one or more learned activation function parameters; and
a plurality of other learnable parameters of the neural network;

instructions that are executable by one or more processors to cause a computing system to perform operations, wherein the operations comprise:
executing the neural network to propagate an input to the neural network through the plurality of nodes in the first layer using the first one or more learned activation function parameters to execute the activation function and through the plurality of nodes in the second layer using the second one or more learned activation function parameters to execute the activation function.

2. The one or more non-transitory computer-readable media of claim 1, wherein the two or more piecewise segments of the first layer comprise a nonlinear polynomial segment having at least one polynomial coefficient defined by at least one of the first one or more learned activation function parameters.

3. The one or more non-transitory computer-readable media of claim 1, wherein the activation function comprises a leaky region.

4. The one or more non-transitory computer-readable media of claim 2, wherein the two or more piecewise segments of the first layer comprise a linear segment, wherein at least one of the first one or more learned activation function parameters define:
a gradient of the linear segment, or
a bias of the linear segment.

5. The one or more non-transitory computer-readable media of claim 1, wherein the first one or more learned activation function parameters and the second one or more learned activation function parameters have identical values.

6. The one or more non-transitory computer-readable media of claim 1, wherein the two or more piecewise segments comprise a left linear segment, a middle quadratic segment, and a right linear segment.

7. The one or more non-transitory computer-readable media of claim 1, the operations comprising:
generating a variant of the neural network, wherein generating the variant of the neural network comprises replacing, in the neural network, the activation function with a deployment activation function that is based on the activation function, wherein the deployment activation function expresses the activation function as a combination of:
a plurality of shifted rectified linear unit functions,
a plurality of hard tanh functions, or
both; and
deploying the variant of the neural network.

8. The one or more non-transitory computer-readable media of claim 1, wherein the activation function comprises a left full stop region, a middle quadratic region, and a right pass region.

9. The one or more non-transitory computer-readable media of claim 1, wherein the activation function comprises a left full stop region, a middle leaky region, and a right pass region.

10. The one or more non-transitory computer-readable media of claim 9, wherein the left full stop region comprises a left linear segment, wherein the middle leaky region comprises a middle linear segment, and wherein the right pass region comprises a right linear segment.

11. The one or more non-transitory computer-readable media of claim 10, wherein the activation function further comprises a left transition quadratic segment between the left linear segment and the middle linear segment, and a right transition quadratic segment between the middle linear segment and right linear segment.

12. A computing system, comprising:
one or more processors; and
one or more non-transitory computer-readable media storing:
a neural network comprising:
a first layer comprising an activation function for each of a plurality of nodes in the first layer, the activation function parameterized by first one or more learned activation function parameters defining two or more first piecewise segments, wherein the activation function is monotonic over the two or more first piecewise segments, and wherein each respective first piecewise segment of the two or more first piecewise segments has a respective first gradient that is continuous at one or more first transition points between the two or more first piecewise segments;
a second layer comprising the activation function for each of a plurality of nodes in the second layer, the activation function parameterized in the second layer by second one or more learned activation function parameters defining two or more second piecewise segments, wherein the activation function is monotonic over the two or more second piecewise segments, and wherein each respective second piecewise segment of the two or more second piecewise segments has a respective second gradient that is continuous at one or more second transition points between the two or more second piecewise segments;
wherein the neural network is trained to jointly learn:
the first one or more learned activation function parameters;
the second one or more learned activation function parameters; and
a plurality of other learnable parameters of the neural network;
instructions that are executable by the one or more processors to cause the computing system to perform operations, wherein the operations comprise:
executing the neural network to propagate an input to the neural network through the plurality of nodes in the first layer using the first one or more learned activation function parameters to execute the activation function and through the plurality of nodes in the second layer using the second one or more learned activation function parameters to execute the activation function.

13. The computing system of claim 12, wherein the two or more piecewise segments of the first layer comprise a nonlinear polynomial segment having at least one polynomial coefficient defined by at least one of the first one or more learned activation function parameters.

14. The computing system of claim 12, wherein the activation function comprises a leaky region.

15. The computing system of claim 13, wherein the two or more piecewise segments of the first layer comprise a linear segment, wherein at least one of the first one or more learned activation function parameters define:
  a gradient of the linear segment, or
  a bias of the linear segment.

16. The computing system of claim 12, wherein the first one or more learned activation function parameters and the second one or more learned activation function parameters have identical values.

17. The computing system of claim 12, wherein the two or more piecewise segments comprise a left linear segment, a middle quadratic segment, and a right linear segment.

18. The computing system of claim 12, the operations comprising:
  generating a variant of the neural network, wherein generating the variant of the neural network comprises replacing, in the neural network, the activation function with a deployment activation function that is based on the activation function, wherein the deployment activation function expresses the activation function as a combination of:
    a plurality of shifted rectified linear unit functions,
    a plurality of hard tanh functions, or
    both; and
  deploying the variant of the neural network.

19. The computing system of claim 12, wherein:
  the activation function comprises a left full stop region, a middle leaky region, and a right pass region;
  the left full stop region comprises a left linear segment, wherein the middle leaky region comprises a middle linear segment, and wherein the right pass region comprises a right linear segment; and
  the activation function comprises:
    a left transition quadratic segment between the left linear segment and the middle linear segment; and
    a right transition quadratic segment between the middle linear segment and right linear segment.

20. The computing system of claim 12, the operations comprising:
  training the neural network on a set of training data, wherein training the neural network comprises:
    updating the first one or more learned activation function parameters;
    updating the second one or more learned activation function parameters; and
    updating the plurality of other learnable parameters of the neural network.

21. A computer-implemented method, comprising:
  executing, by a computing system comprising one or more computing devices, a neural network to propagate an input to the neural network through a plurality of nodes in a first layer of the neural network using first one or more learned activation function parameters to execute the activation function and through the plurality of nodes in a second layer of the neural network using second one or more learned activation function parameters to execute the activation function, the neural network comprising:
    the first layer comprising an activation function for each of a plurality of nodes in the first layer, the activation function parameterized by the first one or more learned activation function parameters defining two or more first piecewise segments, wherein the activation function is monotonic over the two or more first piecewise segments, and wherein each respective first piecewise segment of the two or more first piecewise segments has a respective first gradient that is continuous at one or more first transition points between the two or more first piecewise segments;
    the second layer comprising the activation function for each of a plurality of nodes in the second layer, the activation function parameterized in the second layer by the second one or more learned activation function parameters defining two or more second piecewise segments, wherein the activation function is monotonic over the two or more second piecewise segments, and wherein each respective second piecewise segment of the two or more second piecewise segments has a respective second gradient that is continuous at one or more second transition points between the two or more second piecewise segments;
    wherein the neural network is trained to jointly learn:
      the first one or more learned activation function parameters;
      the second one or more learned activation function parameters; and
      a plurality of other learnable parameters of the neural network.

22. The computer-implemented method of claim 21, wherein the two or more piecewise segments of the first layer comprise a nonlinear polynomial segment having at least one polynomial coefficient defined by at least one of the first one or more learned activation function parameters.

23. The computer-implemented method of claim 21, wherein the activation function comprises a leaky region.

24. The computer-implemented method of claim 22, wherein the two or more piecewise segments of the first layer comprise a linear segment, wherein at least one of the first one or more learned activation function parameters define:
  a gradient of the linear segment, or
  a bias of the linear segment.

25. The computer-implemented method of claim 21, wherein the first one or more learned activation function parameters and the second one or more learned activation function parameters have identical values.

26. The computer-implemented method of claim 21, wherein the two or more piecewise segments comprise a left linear segment, a middle quadratic segment, and a right linear segment.

27. The computer-implemented method of claim 21, comprising:
  generating a variant of the neural network, wherein generating the variant of the neural network comprises replacing, in the neural network, the activation function with a deployment activation function that is based on the activation function, wherein the deployment activation function expresses the activation function as a combination of:
    a plurality of shifted rectified linear unit functions,
    a plurality of hard tanh functions, or
    both; and
  deploying the variant of the neural network.

28. The computer-implemented method of claim 21, wherein:
  the activation function comprises a left full stop region, a middle leaky region, and a right pass region;
  the left full stop region comprises a left linear segment, wherein the middle leaky region comprises a middle linear segment, and wherein the right pass region comprises a right linear segment; and the activation function comprises:
  a left transition quadratic segment between the left linear segment and the middle linear segment; and
  a right transition quadratic segment between the middle linear segment and right linear segment.

29. The computer-implemented method of claim 21, comprising:
  training the neural network on a set of training data, wherein training the neural network comprises:
  updating the first one or more learned activation function parameters;
  updating the second one or more learned activation function parameters; and
  updating the plurality of other learnable parameters of the neural network.

* * * * *